US012659767B2

(12) United States Patent
Zheng

(10) Patent No.: US 12,659,767 B2
(45) Date of Patent: Jun. 16, 2026

(54) TESTING METHOD, DEVICE AND SYSTEM BASED ON SoftSIM

(71) Applicant: Samsung Electronics Co., Ltd., Suwon-si (KR)

(72) Inventor: Xiangxian Zheng, Suzhou Industrial Park (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 443 days.

(21) Appl. No.: 18/326,622

(22) Filed: May 31, 2023

(65) Prior Publication Data

US 2023/0397022 A1     Dec. 7, 2023

(30) Foreign Application Priority Data

Jun. 2, 2022    (CN) .......................... 202210625633.6

(51) Int. Cl.
*H04W 24/06*       (2009.01)
*H04W 8/18*        (2009.01)
*H04W 60/00*       (2009.01)

(52) U.S. Cl.
CPC ............. *H04W 24/06* (2013.01); *H04W 8/18* (2013.01); *H04W 60/005* (2013.01)

(58) Field of Classification Search
CPC ..... H04W 24/06; H04W 8/18; H04W 60/005; H04W 24/08
See application file for complete search history.

(56) References Cited

U.S. PATENT DOCUMENTS

| | | | |
|---|---|---|---|
| 6,272,450 B1 | 8/2001 | Hill et al. | |
| 8,238,905 B2 | 8/2012 | Jiang | |
| 9,768,893 B1 * | 9/2017 | Wank ................. | H04B 17/0085 |

(Continued)

FOREIGN PATENT DOCUMENTS

| | | |
|---|---|---|
| CN | 104796880 A | 7/2015 |
| CN | 105897484 A | 8/2016 |

(Continued)

OTHER PUBLICATIONS

Chinese Office Action dated Feb. 22, 2025 issued in Chinese Patent Application No. 2025022200044930.

*Primary Examiner* — Marisol Figueroa
(74) *Attorney, Agent, or Firm* — Harness, Dickey & Pierce, P.L.C.

(57) ABSTRACT

A testing method, device and/or system based on a Soft Subscriber Identity Module (SoftSIM) are provided. The testing method based on a SoftSIM including receiving a SoftSIM and a testing traffic value transmitted by a SoftSIM cloud server, importing and activating the received SoftSIM and completing registration in a network, and performing a real-network testing based on the SoftSIM and the received testing traffic value may be provided. According to the testing method, automatic real-network testing of a production line can be achieved by using limited SoftSIM resources and traffic to avoid frequent insertion of physical SIM cards on the production line, and the cost of a large number of physical SIM cards is saved and testing is facilitated by using flexible SoftSIM configurations. The use of dynamically configurable SoftSIM communication avoids wasting the communication cost of individual physical SIM cards.

14 Claims, 10 Drawing Sheets

(56)                    References Cited

U.S. PATENT DOCUMENTS

| 10,462,647 | B2 | 10/2019 | Chen et al. |
| 10,701,572 | B2 | 6/2020 | Magham et al. |
| 2015/0163124 | A1* | 6/2015 | Girmonsky ............ H04L 43/50 |
| | | | 709/224 |
| 2017/0034849 | A1 | 2/2017 | Kanamarlapudi et al. |
| 2021/0105626 | A1 | 4/2021 | Olshinka et al. |
| 2021/0120399 | A1 | 4/2021 | Auer et al. |

FOREIGN PATENT DOCUMENTS

| CN | 106533841 | A | 3/2017 | |
| CN | 110446171 | A | 11/2019 | |
| CN | 110876123 | A | 3/2020 | |
| CN | 112911629 | A | 6/2021 | |
| WO | WO-2019042542 | A1 * | 3/2019 | ............ H04W 8/205 |

* cited by examiner

Receiving a SoftSIM and a testing traffic value transmitted by a SoftSIM cloud server — S310

Importing and activating the received SoftSIM and completing registration in network — S320

Performing a real-network testing based on the SoftSIM and the received testing traffic value — S330

FIG. 9

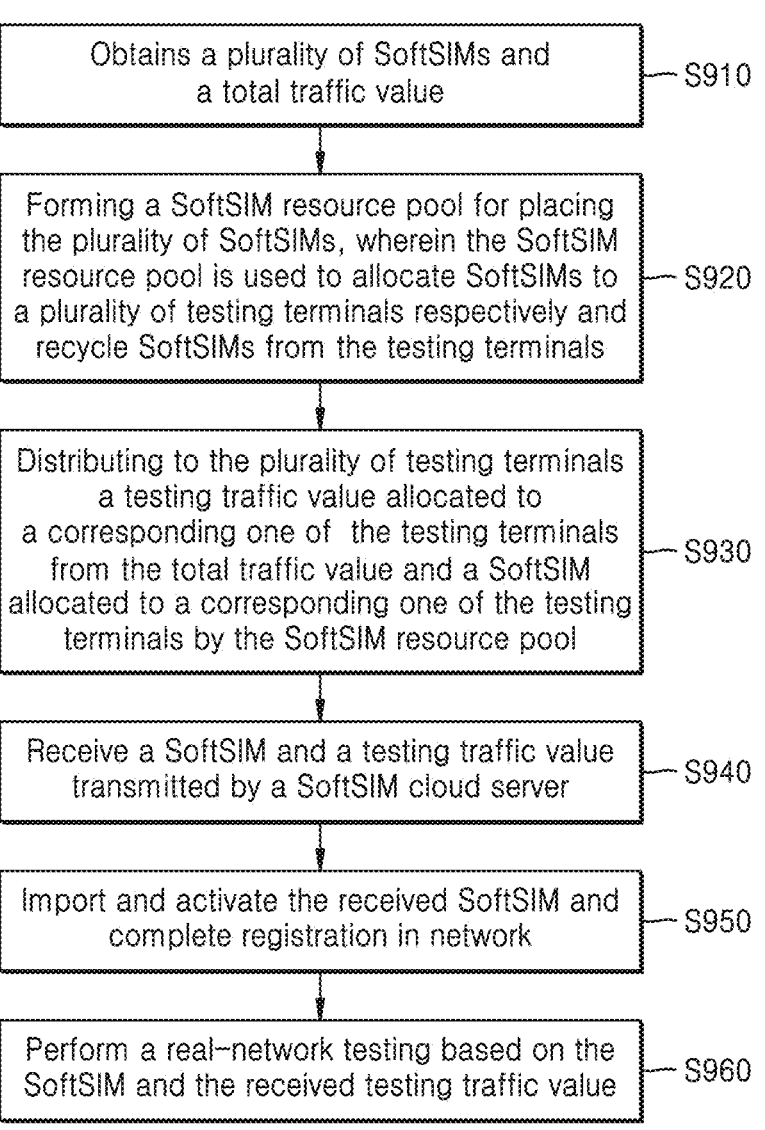

Obtains a plurality of SoftSIMs and a total traffic value ⎯ S910

Forming a SoftSIM resource pool for placing the plurality of SoftSIMs, wherein the SoftSIM resource pool is used to allocate SoftSIMs to a plurality of testing terminals respectively and recycle SoftSIMs from the testing terminals ⎯ S920

Distributing to the plurality of testing terminals a testing traffic value allocated to a corresponding one of the testing terminals from the total traffic value and a SoftSIM allocated to a corresponding one of the testing terminals by the SoftSIM resource pool ⎯ S930

Receive a SoftSIM and a testing traffic value transmitted by a SoftSIM cloud server ⎯ S940

Import and activate the received SoftSIM and complete registration in network ⎯ S950

Perform a real-network testing based on the SoftSIM and the received testing traffic value ⎯ S960

TESTING METHOD, DEVICE AND SYSTEM
BASED ON SoftSIM

CROSS-REFERENCE TO RELATED
APPLICATION

This application is based on and claims priority under 35
U.S.C. § 119 to Chinese Patent Application No.
202210625633.6, filed on Jun. 2, 2022, in the Chinese
Intellectual Property Office, the disclosure of which is
incorporated by reference herein in its entirety.

BACKGROUND

Technical Field

The disclosure relates to a communication technology
field, and in particular, to testing methods, devices and/or
systems based on SoftSIM.

Description of the Related Art

With the development of communication technology and
the growth of demand for subscriber information identifi-
cation in air communication, the traditional physical SIM
(Subscriber Identity Module) card can no longer meet the
industrial demand under the scenario of terminal equipment
manufacturers simplifying the equipment production proce-
dure and users roaming abroad for multiple services. There-
fore, many innovations and technical means come into
being, and SoftSIM (SOFTSIM, or virtual SIM) is one of
them. SoftSIM is a technology that can implement all the
functions of a physical SIM with trusted software methods,
can be used in scenarios such as international roaming, and
has already been commercialized in apps such as Samsung's
s-roaming and Huawei's skytone.

For testing consistency and stability, large-scale real-
network testing needs to be performed on the production
line. When performing large-scale real-network testing, fre-
quent physical SIM card switching or network access via
embedded SIM is required. In actual testing, not all manu-
factured terminals can support insertion of physical SIMs or
embedded SIMS, and thus, it is difficult to achieve large-
scale network testing.

SUMMARY

The present disclosure provides testing methods, devices
and/or systems based on a Soft Subscriber Identity Module
(SoftSIM) to solve at least the technical problems of the
related technology that requires frequent physical SIM card
switching during testing on a production line and causes
waste of physical SIM cards, which make it difficult to
achieve large-scale network testing when the manufactured
terminals do not support physical SIMs or embedded SIMs.
According to an example embodiment of this disclosure,
a testing method based on a SoftSIM may include receiving
a SoftSIM and a testing traffic value transmitted by a
SoftSIM cloud server, importing and activating the received
SoftSIM and completing registration in network, and per-
forming a real-network testing based on the SoftSIM and the
received testing traffic value.
According to an example embodiment of this disclosure,
the performing may be preceded by predicting a first traffic
predicted value desired for the testing task, transmitting the
first traffic predicted value to the SoftSIM cloud server, and
receiving a first traffic indication value assigned by the SoftSIM cloud server as the testing traffic value, and the first
traffic indication value is determined to be equal to the first
traffic predicted value by the SoftSIM cloud server if the first
traffic predicted value is greater than a testing traffic value.
According to an example embodiment of this disclosure,
wherein the performing may include transmitting a remain-
ing traffic value to the SoftSIM cloud server, transmitting a
second traffic predicted value additionally desired for the
testing task to the SoftSIM cloud server based on an indi-
cation from the SoftSIM cloud server, and receiving a
second traffic indication value assigned by the SoftSIM
cloud server as the available remaining traffic value for the
real-network testing, wherein the second traffic indication
value is determined to be equal to the second traffic pre-
dicted value by the SoftSIM cloud server when the second
traffic predicted value is greater than the remaining traffic
value.
According to an example embodiment of this disclosure,
the method may further include deactivating and deleting the
SoftSIM after completion of the real-network testing, and
returning the deleted SoftSIM and a remaining traffic value
to the SoftSIM cloud server.
According to an example embodiment of this disclosure,
a testing method based on a SoftSIM may include obtaining
a plurality of SoftSIMs and a total traffic value, forming a
SoftSIM resource pool configured to place the plurality of
SoftSIMs thereon and configured to allocate SoftSIMs to a
plurality of testing terminals, respectively, and recycle
SoftSIMs from the plurality of testing terminals, and dis-
tributing to the plurality of testing terminals a testing traffic
value allocated to a corresponding one of the testing termi-
nals from the total traffic value and a SoftSIM allocated to
a corresponding one of the testing terminals by the SoftSIM
resource pool.
According to an example embodiment of this disclosure,
the obtaining may include connecting to a mobile virtual
network operator (MVNO), and obtaining the plurality of
SoftSIMs and the total traffic value transmitted by the
MVNO.
According to an example embodiment of this disclosure,
the obtaining may include evaluating a number of SoftSIMs
based on a number of the plurality of testing terminals and
a historical number of testing terminals, evaluating the total
traffic value based on the number of the plurality of testing
terminals, the historical number of testing terminals and a
maximum testing traffic value of testing terminals, and
obtaining the plurality of SoftSIMs for the number of
SoftSIMs evaluated and the total traffic value from the
virtual network operator (MVNO).
According to an example embodiment of this disclosure,
the distributing may include connecting to the plurality of
testing terminals, receiving SoftSIM requests transmitted by
the plurality of testing terminals, distributing a testing traffic
value and a SoftSIM allocated to a corresponding one of the
testing terminals to the plurality of test terminals based on
the SoftSIM requests, wherein the testing traffic value is a
default traffic value.
According to an example embodiment of this disclosure,
the method may further include obtaining a first traffic
predicted value of a testing terminal from among the testing
terminals, the first traffic predicted value being a traffic value
predicted by the testing terminal for the testing task, trans-
mitting a first traffic indication value to the testing terminal
if the first traffic predicted value is greater than the testing
traffic value of the testing terminal, and updating the testing
traffic value of the testing terminal with the first traffic
indication value, which is equal to the first traffic predicted value, and setting a maximum testing traffic value equal to the updated testing traffic value.

According to an example embodiment of this disclosure, the method may further include obtaining a remaining traffic value of the testing terminal in real time, instructing the testing terminal to transmit a second traffic predicted value additionally desired for the testing task when the remaining traffic value is less than or equal to the reference traffic value or is zero, obtaining the second traffic predicted value transmitted by the testing terminal, and if the second traffic predicted value is greater than the remaining traffic value, transmitting the second traffic indication value to the testing terminal and updating the remaining traffic value of the testing terminal with the second traffic indication value, and updating the maximum testing traffic value equal to the second traffic indication value plus a difference between the testing traffic value and the remaining traffic value, wherein the second traffic indication value is equal to the second traffic predicted value.

According to an example embodiment of this disclosure, the method may further include receiving and recycling a set of SoftSIMs and a set of remaining traffic values returned by the plurality of testing terminals, and putting the set of SoftSIMs back into the SoftSIM resource pool.

According to an example embodiment of this disclosure, a testing terminal may include a memory configured to store computer-readable instructions, and one or more processors configured to connect to the memory and execute the computer-readable instructions such that the one or more processors are configured to cause the testing terminal to receive a SoftSIM and a testing traffic value transmitted by a SoftSIM cloud server, import and activate the received SoftSIM and complete registration in a network, and perform a real-network testing based on the SoftSIM and the received testing traffic value.

According to an example embodiment of this disclosure, the one or more processors of the testing terminal may be further configured to cause the testing terminal to predict a first traffic predicted value required for the testing task, transmit the first traffic predicted value to the SoftSIM cloud server, and receive a first traffic indication value assigned by the SoftSIM cloud server as the testing traffic value, and the first traffic indication value is determined to be equal to the first traffic predicted value by the SoftSIM cloud server if the first traffic predicted value is greater than the testing traffic value.

According to an example embodiment of this disclosure, the one or more processors of the testing terminal may be further configured to transmit a remaining traffic value to the SoftSIM cloud server, transmit a second traffic predicted value additionally desired for the testing task to the SoftSIM cloud server based on the indication from the SoftSIM cloud server, and receive a second traffic indication value assigned by the SoftSIM cloud server as the available remaining traffic value for the real-network testing. The second traffic indication value may be determined to be equal to the second traffic predicted value by the SoftSIM cloud server when the second traffic predicted value is greater than the remaining traffic value.

According to an example embodiment of this disclosure, the one or more processors of the testing terminal may be further configured to deactivate and delete the SoftSIM after completion of the real-network testing, return the deleted SoftSIM and the remaining traffic value to the SoftSIM cloud server.

According to an example embodiment of this disclosure, a testing terminal may include a processor, a memory storing a computer program that when executed by the processor, causes the testing terminal to perform the aforementioned testing method based on a SoftSIM.

According to an example embodiment of this disclosure, a SoftSIM cloud server may include a memory configured to store computer-readable instructions, and one or more processors configured to connect to the memory and execute the computer-readable instructions such that the one or more processors are configured to cause the SoftSIM cloud server to obtain a plurality of SoftSIMs and a total traffic value, form a SoftSIM resource pool configured to place the plurality of SoftSIMs thereon and configured to allocate SoftSIMs to the plurality of testing terminals, respectively, and recycle SoftSIMs from a plurality of testing terminals, and distribute to the plurality of testing terminals a testing traffic value allocated to a corresponding one of the testing terminals from the total traffic value and a SoftSIM allocated to a corresponding one of the testing terminals by the SoftSIM resource pool.

According to an example embodiment of this disclosure, the one or more processors of the SoftSIM cloud server may be further configured to cause the SoftSIM cloud server to connect to a mobile virtual network operator (MVNO), and obtain the plurality of SoftSIMs and total traffic value transmitted by the MVNO.

According to an example embodiment of this disclosure, the one or more processors of the SoftSIM cloud server may be further configured to evaluate a number of SoftSIMs based on a number of plurality of testing terminals and a historical number of testing terminals, evaluate the total traffic value based on the number of plurality of testing terminals, the historical number of testing terminals and a maximum testing traffic value of testing terminals, and obtain the plurality of SoftSIMs for the number of SoftSIMs evaluated and the total traffic value from the mobile virtual network operator (MVNO).

According to an example embodiment of this disclosure, the one or more processors of the SoftSIM cloud server may be further configured to connect to the plurality of testing terminals, receive SoftSIM requests transmitted by the plurality of testing terminals, and distribute a testing traffic value and a SoftSIM allocated to a corresponding one of the testing terminals to the plurality of testing terminals based on the SoftSIM requests, wherein the testing traffic value is a default traffic value.

According to an example embodiment of this disclosure, the one or more processors of the SoftSIM cloud server may be further configured to obtain a first traffic predicted value of the testing terminal, the first traffic predicted value being a traffic value predicted by the testing terminal to be desired for the testing task, transmit a first traffic indication value to the testing terminal if the first traffic predicted value is greater than the testing traffic value of the testing terminal, and update the testing traffic value of the testing terminal with the first traffic indication value, which is equal to the first traffic predicted value, and set a maximum testing traffic value equal to the updated testing traffic value.

According to an example embodiment of this disclosure, the one or more processors of the SoftSIM cloud server may be further configured to obtain a remaining traffic value of a testing terminal in real time, instruct the testing terminal to transmit a second traffic predicted value additionally desired for the testing task when the remaining traffic value is less than or equal to the reference traffic value or is zero, obtain the second traffic predicted value transmitted by the testing terminal, and if the second traffic predicted value is greater than the remaining traffic value, transmit the second traffic indication value to the testing terminal and update the remaining traffic value of the testing terminal with the second traffic indication value, and update the maximum testing traffic value to be equal to the second traffic indication value plus a difference between the testing traffic value and the remaining traffic value, wherein the second traffic indication value is equal to the second traffic predicted value.

According to an example embodiment of this disclosure, the one or more processors of the SoftSIM cloud server may be further configured to receive and recycle a set of SoftSIMs and a set of remaining traffic values returned by the plurality of testing terminals, and put the set of SoftSIMs back into the SoftSIM resource pool.

According to an example embodiment of this disclosure, a SoftSIM cloud server may include a processor, a memory storing a computer program that when executed by the processor, causes the SoftSIM cloud server to perform the aforementioned testing method based on SoftSIM.

According to an example embodiment of this disclosure, a non-transitory computer-readable storage medium storing a computer program, which when executed by at least one processor, causes a computer system to implement the aforementioned testing method based on SoftSIM.

According to an example embodiment of this disclosure, a testing method based on a SoftSIM may include obtaining, by a SoftSIM cloud server, a plurality of SoftSIMs and a total traffic value, forming, by the SoftSIM cloud server, a SoftSIM resource pool configured to place the plurality of SoftSIMs thereon and configured to allocate SoftSIMs to a plurality of testing terminals, respectively, and recycle SoftSIMs from the plurality of testing terminals, and distributing, by the SoftSIM cloud server, to the plurality, of testing terminals a testing traffic value allocated to a corresponding one of the testing terminals from the total traffic value and a SoftSIM allocated to a corresponding one of the testing terminals by the SoftSIM resource pool, and receiving, by each of the plurality of testing terminals, a SoftSIM and a testing traffic value transmitted by the SoftSIM cloud server, importing and activating, by each of the plurality of testing terminals, the received SoftSIM and completing registration in a network, and performing, by each of the plurality of testing terminals, a real-network testing based on the received SoftSIM and the received testing traffic value.

According to an example embodiment of this disclosure, a testing system based on a SoftSIM may include a SoftSIM cloud server and a plurality of testing terminals. The SoftSIM cloud server may be configured to obtain a plurality of SoftSIMs and a total traffic value, form a SoftSIM resource pool configured to place the plurality of SoftSIMs thereon and configured to allocate SoftSIMs to the plurality of testing terminals, respectively, and recycle SoftSIMs from the plurality of testing terminals, distribute to the plurality of testing terminals a testing traffic value allocated to a corresponding one of the testing terminals from the total traffic value and a SoftSIM allocated to a corresponding one of the testing terminals by the SoftSIM resource pool. The plurality of testing terminals may be configured to receive a SoftSIM and a testing traffic value transmitted by the SoftSIM cloud server, import and activate the received SoftSIM and complete registration in a network, and perform a real-network testing based on the received SoftSIM and the received testing traffic value.

The technical solutions provided according to some example embodiments of the disclosure bring at least some beneficial effects. For example, automatic real-network testing of a production line can be achieved by using limited SoftSIM resources and traffic to avoid frequent insertion of physical SIM cards on the production line, and cost of a large number of physical SIM cards is saved and testing is facilitated by using flexible SoftSIM configurations. The use of dynamically configurable SoftSIM communication avoids wasting the communication cost of individual physical SIM cards.

It should be understood that the above general description and the later detailed description are merely examples and do not limit the disclosure.

BRIEF DESCRIPTION OF THE DRAWINGS

The accompanying drawings herein are incorporated into and form part of the specification, illustrate some example embodiments consistent with the disclosure, which are used in conjunction with the specification to explain the principles of the disclosure and do not constitute an undue limitation of the disclosure.

FIG. 9 illustrates a flowchart of a testing method based on SoftSIM in which a testing terminal and a SoftSIM cloud server participate together according to an example embodiment.

DETAILED DESCRIPTION

In order to enable a person of ordinary skill in the art to better understand the technical solutions (or inventive concepts) of the disclosure, the technical solutions (or inventive concepts) in some example embodiments of the disclosure will be clearly and completely described below in conjunction with the accompanying drawings.

It should be noted that the terms "first", "second", etc. in the specification and claims of the disclosure and the accompanying drawings above are used to distinguish similar objects rather than to describe a particular order or sequence. It should be understood that the data used like that may be interchanged, where appropriate, so that example embodiments of the disclosure described herein can be implemented in an order other than those illustrated or described herein. The example embodiments described in the following examples do not represent all example embodiments that are consistent with the disclosure. Rather, they are only examples of devices and methods that are consistent with some aspects of the disclosure, as detailed in the appended claims.

It should be noted herein that "at least one of the several items" in this disclosure includes the juxtaposition of these three categories (e.g., "any one of the several items", "any combination of the several items" and "all of the several items"). For example, "including at least one of A and B" includes the following three juxtapositions: (1) including A, (2) including B, (3) including A and B. Another example is "performing at least one of step one and step two", which means the following three juxtapositions (1) performing step one; (2) performing step two, (3) performing step one and step two.

Figure 1:
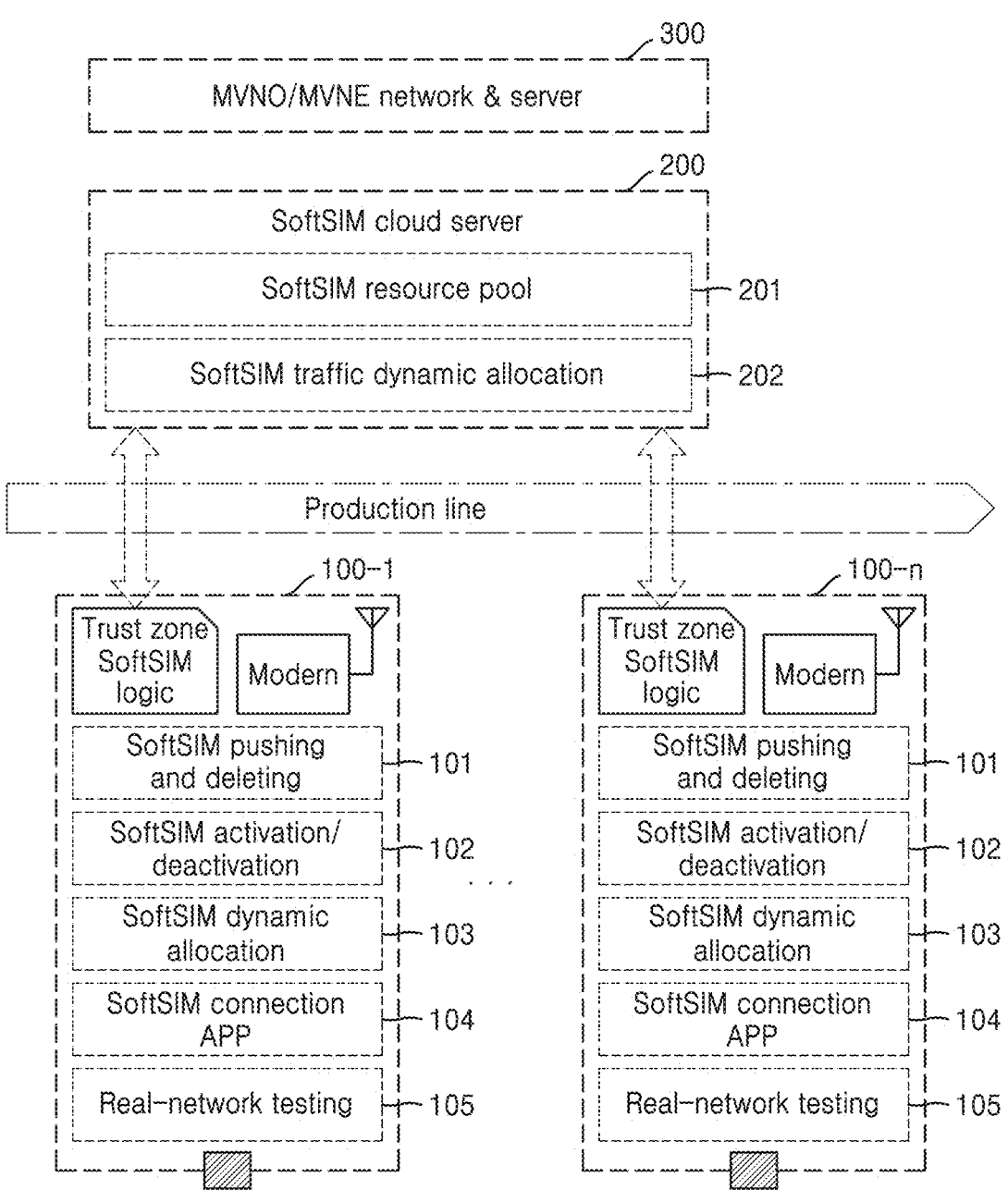
FIG. 1 illustrates a testing architecture based on SoftSIM testing according to an example embodiment.

FIG. 1 illustrates a testing architecture based on SoftSIM testing according to an example embodiment.

As shown in FIG. 1, the testing architecture based on SoftSIM testing may include testing terminals 100-1, 100-2 . . . 100-n, a SoftSIM cloud server 200, and a mobile virtual network operator (MVNO/MVNE) network & a server 300. Here, testing terminals 100-1, 100-2 . . . 100-n may be devices with communication capabilities. For example, testing terminals 100-1, 100-2 . . . 100-n in some example embodiments of the disclosure may be cell phones, tablets, desktops, laptops, handheld computers, notebooks, wearable apparatus (such as smart watches, smart bracelets, smart glasses, head-mounted displays (HMD)), netbooks, personal digital assistants (PDA), augmented reality (AR)/virtual reality (VR) apparatus. Testing terminals 100-1, 100-2 . . . 100-n can access network and communicate via wireless cellular networks (e.g., 4G and 5G networks), Wifi networks, etc. A plurality of testing terminals may be connected to the SoftSIM cloud server 200 for testing on the production line as shown in FIG. 1, the testing terminal 100 may include a SoftSIM pushing and deleting module 101, a SoftSIM activation/deactivation module 102, a SoftSIM dynamic allocation module 103, a SoftSIM connection APP module 104, and a real-network testing module 105, wherein the SoftSIM pushing and deleting module 101 completes the installation and deletion of SoftSIMs in a trusted environment, the SoftSIM activation/deactivation module 102 completes the registration of SoftSIMs in the current network, the SoftSIM dynamic allocation module 103 completes the allocation of traffic and dynamic adjustment of traffic, and the SoftSIM connection APP module 104 completes the connection to the SoftSIM cloud server 200 through a USB cable or a Wi-Fi connection. The real-network testing module 105 can complete the network testing.

The SoftSIM cloud server 200 in some example embodiments of the disclosure may include a SoftSIM resource pool 201 and a SoftSIM traffic dynamic allocation module 202, wherein the SoftSIM resource pool module 201 manages the allocation and recycle of SoftSIMs and allocates SoftSIMs to testing terminals or recycles SoftSIMs from testing terminals according to testing demands. Here, the SoftSIM cloud server 200 may connect to MVNO/MVNE network & server 300, and the traffic obtained from MVNO/MVNE network & server 300 is managed by the SoftSIM traffic dynamic allocation module 202, which dynamically allocates the traffic to each testing terminal (the testing terminal to which a SoftSIM is allocated) and dynamically adjusts the traffic allocated to each terminal according to the testing demands of the testing terminal. It should be understood that the description of the system environment architecture herein is only an example and the disclosure does not limit to this.

Figure 2:
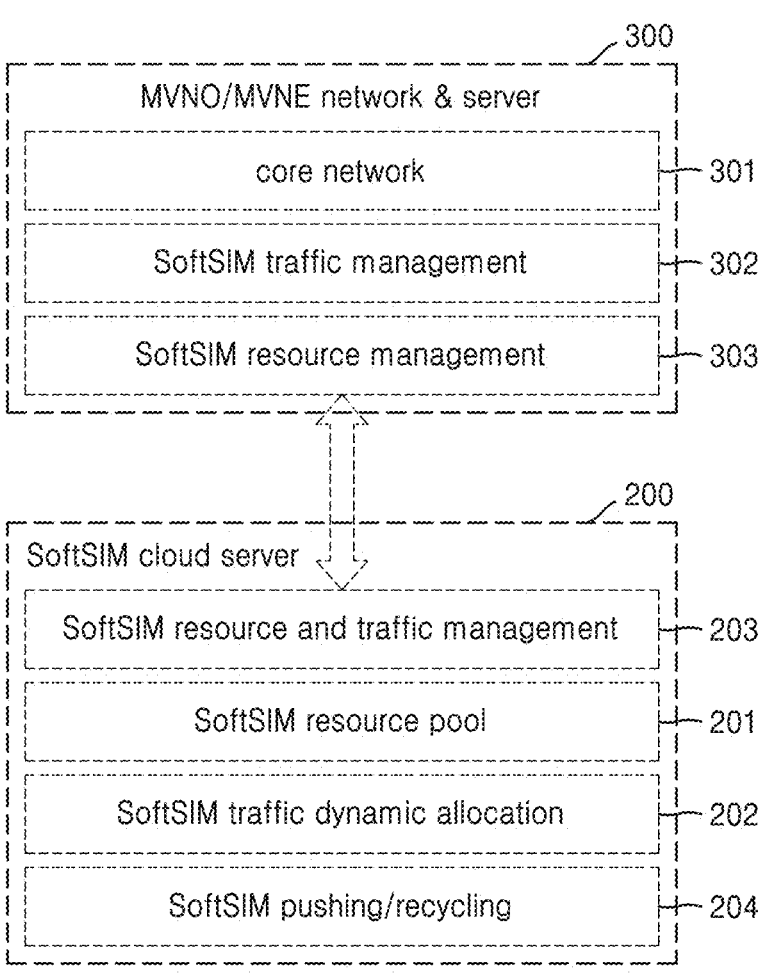
FIG. 2 illustrates the architecture of a SoftSIM cloud server according to an example embodiment.

To better illustrate the SoftSIM cloud server 200, FIG. 2 illustrates the architecture of the SoftSIM cloud server according to an example embodiment.

As shown in FIG. 2, the SoftSIM cloud server 200 may include a SoftSIM resource and traffic management module 203 and a SoftSIM pushing/recycling module 204 in addition to the SoftSIM resource pool module 201 and the SoftSIM traffic dynamic allocation module 202. The SoftSIM resource and traffic management module 203 performs an expected assessment of the SoftSIM resource requirements and the total traffic and periodically obtains the number of SoftSIM and the total traffic from the MVNO/MVNE network & server 300. The SoftSIM pushing/recycling module 204 connects to the SoftSIM connection APP 104 of the testing terminal 100 to achieve SoftSIM pushing and recycling. Further, the SoftSIM resource pool module 201 can also evaluate the SoftSIM requirements over a period of time and increase or decrease the number of SoftSIM obtained from the MVNO/MVNE network & server 300 via the SoftSIM resource and traffic management module 203, and the SoftSIM traffic dynamic allocation module 202 can also estimate the total traffic requirements over a period of time and increase or decrease the total traffic that the SoftSIM resource and traffic management module 203 obtains from the MVNO/MVNE network & server 300.

Also, MVNO/MVNE network & server 300 may include core network 301 and a SoftSIM traffic management module 302 and a SoftSIM resource management module 303, wherein the SoftSIM traffic management module 302 and the SoftSIM resource management module 303 implement the management of SoftSIM traffic and the management of SoftSIM resources to be allocated to the SoftSIM cloud server 200, respectively.

It should be understood that the description of the architecture of the SoftSIM cloud server herein is only an example, and the disclosure does not limit to this.

Figure 3:
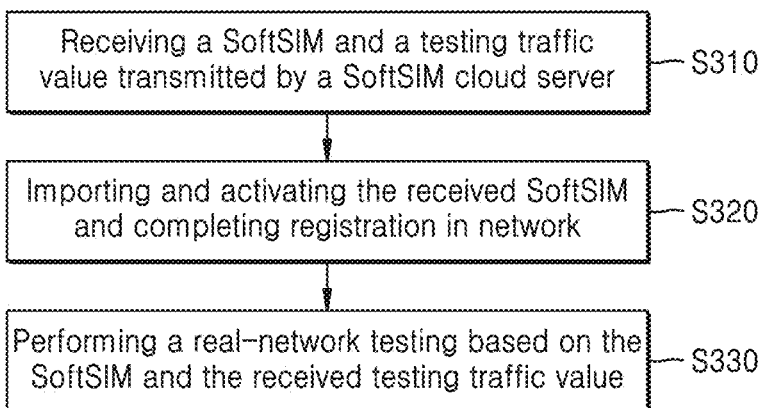
FIG. 3 illustrates a flowchart of a testing method based on SoftSIM on a testing terminal side according to an example embodiment.

FIG. 3 illustrates a flowchart of a testing method based on SoftSIM on a testing terminal side according to an example embodiment.

First, in operation S310, a SoftSIM and a testing traffic value transmitted by a SoftSIM cloud server may be received. In this example embodiment, the testing terminal 100 may establish a connection with the SoftSIM cloud server 200. For example, the SoftSIM connection APP module 104 of the testing terminal 100 may complete the connection with the SoftSIM pushing/recycling module 204 of the SoftSIM cloud server 200 via a USB cable or a Wi-Fi connection. The testing terminal 100 may transmit a SoftSIM request to the SoftSIM cloud server 200 and receive a SoftSIM and a testing traffic value allocated by the SoftSIM cloud server 200 based on the SoftSIM request, wherein the testing traffic value may be a default traffic value.

Next, in operation S320, the received SoftSIM may be imported and activated and registration in a network may be completed. In this example embodiment, for example, the SoftSIM pushing and deleting module 101 of the testing terminal 100 may complete the import and installation of the SoftSIM in the trusted environment, and the SoftSIM may include card information such as International Mobile Subscriber Identifier (IMSI) and key indentifier (KI). The SoftSIM activation/deactivation module 102 completes the activation of the SoftSIM using the SoftSIM information and completes registration in a network.

After the completing registration in the network, the testing terminal 100 may also predict a first traffic predicted value desired for the testing task, transmit the first traffic predicted value to the SoftSIM cloud server 200, and receive a first traffic indication value assigned by the SoftSIM cloud server 200 as the testing traffic value, wherein if the first traffic predicted value is greater than the testing traffic value, the first traffic indication value is determined to be equal to the first traffic predicted value by the SoftSIM cloud server. In this example embodiment, after completing the registration in the network, the testing terminal 100 can be informed of the actual traffic value (the first traffic predicted value) desired for the testing task. At this time, the assigned testing traffic value may be smaller than the actual traffic value, making it difficult to support the real-network testing. Thus, before starting the real-network testing, the testing terminal 100 can perform a traffic value adjustment (e.g., using the SoftSIM dynamic allocation module 103).

For example, assuming the testing traffic value assigned at the beginning is X (in GB or MB), and after completing registration in a network, the testing terminal 100 predicts the traffic value desired for the testing task to be X' (in GB or MB, the first traffic predicted value). The testing terminal 100 transmits the traffic value X' to the SoftSIM cloud server 200. The SoftSIM cloud server 200 makes a judgment that if X'>X, then the traffic value X' (as the first traffic indication value) is allocated and transmitted to the testing terminal 100, otherwise, no allocation is made. The testing terminal 100 receives the traffic value X' and updates it to be the testing traffic value.

Then, in operation S330, a real-network testing may be performed based on the SoftSIM and the received testing traffic value. In this example embodiment, the testing terminal 100 may use the real-network testing module 105 to complete the air network testing. Further, the testing terminal may transmit the remaining traffic value to the SoftSIM cloud server. According to the example embodiment of the disclosure, the remaining traffic value can be transmitted periodically at a desired (or alternatively, predetermined) interval, so that the SoftSIM cloud server can be informed of the remaining traffic value of the testing terminal 100 in real time. Next, the testing terminal 100 may transmit a second traffic predicted value additionally desired for the testing task (e.g., the real-network testing) to the SoftSIM cloud server based on the indication from the SoftSIM cloud server, so that the SoftSIM cloud server 200 transmits an indication about an available remaining traffic value to the testing terminal 100 after receiving the second traffic predicted value from the testing terminal 100. Here, the second traffic indication value is determined to be equal to the second traffic predicted value by the SoftSIM cloud server when the second traffic predicted value is greater than the remaining traffic value. The testing terminal 100 may then receive the second traffic indication value assigned by the SoftSIM cloud server as the available remaining traffic value for the real-network testing. In this example embodiment, the desired testing traffic may vary during the real-network testing of the testing terminal 100 due to the change of the testing task volume, etc. It may also occur that the allocated testing traffic value is less than the actual desired traffic value and thus it is difficult to support the real-network testing. Therefore, the traffic value of the terminal can be dynamically adjusted during the real-network testing (e.g., using the SoftSIM dynamic allocation module 103).

For example, the testing terminal 100 transmits the remaining traffic value S to the SoftSIM cloud server 200 in real time. The SoftSIM cloud server 200 monitors the remaining traffic value S of the testing terminal in real time, and when the remaining traffic value is less than or equal to the desired (or alternatively, predetermined or reference) traffic value (the desired (or alternatively, predetermined or reference) traffic value can be 10% or 5% of the testing traffic value) or zero, the SoftSIM cloud server 200 can instruct the testing terminal 100 to transmit the traffic value X' (the second testing traffic value) that is additionally desired for the testing task. Based on the instruction of the SoftSIM cloud server 200, the testing terminal 100 transmits the traffic value X' additionally desired for the testing task to the SoftSIM cloud server 200. The SoftSIM cloud server 200 makes a judgment that if X'>S, then the traffic value X' (as the second traffic indication value) is allocated and transmitted to the testing terminal 100, otherwise, no allocation is made. The testing terminal 100 receives the traffic value X' assigned by the SoftSIM cloud server 200 as the available remaining traffic value for the real-network testing.

After completing real-network testing, the testing terminal may deactivate and delete the SoftSIM and return the deleted SoftSIM and the remaining traffic value to the SoftSIM cloud server. In this example embodiment, for example, after completing the real-network testing, the SoftSIM activation/deactivation module 102 of the testing terminal 100 deactivates the SoftSIM, then the SoftSIM pushing and deleting module 101 deletes the SoftSIM, and the SoftSIM and remaining traffic value are returned to the SoftSIM cloud server 200 by the SoftSIM connection APP module 104. The SoftSIM cloud server may use the SoftSIM pushing/recycling module 204 to receive and recycle SoftSIMs and put them into its own SoftSIM resource pool 201 for other testing terminals or for the next testing, and the SoftSIM cloud server may also record the remaining traffic value for other testing terminals or for the next testing.

After the real-network testing, the test data of the plurality of testing terminals acquired based on testing needs during the testing process are aggregated and processed, and the testing report is generated, so as to learn the function, performance and security of the test terminals and other aspects.

As described above, the testing method based on SoftSIM on the testing terminal side according to the example embodiment can avoid frequent insertion of physical SIM cards on the production line and provide convenience for testing by saving the cost of physical SIM cards through the use of flexible SoftSIM configurations. Further, the use of dynamically configurable SoftSIM communication avoids wasting the communication cost of individual physical SIM cards.

Figure 4:
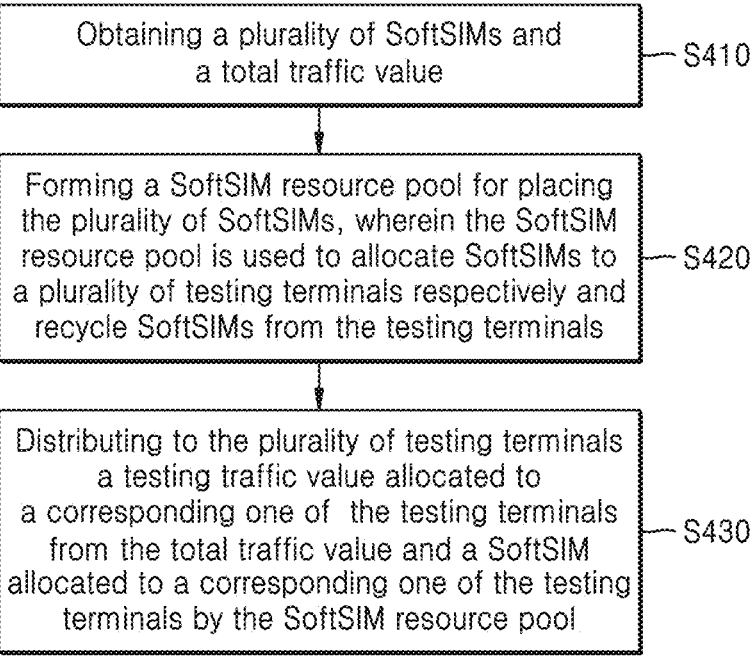
FIG. 4 illustrates a flowchart of a testing method based on SoftSIM on the SoftSIM cloud server side according to an example embodiment.

FIG. 4 illustrates a flowchart of a testing method based on SoftSIM on the SoftSIM cloud server side according to the example embodiment.

First, in operation S410, a plurality of SoftSIMs and a total traffic value may be obtained. According to an example embodiment of the disclosure, the operation of obtaining a plurality SoftSIMs and a total traffic value may include (1) connecting to a mobile virtual network operator MVNO, and (2) obtaining a plurality of SoftSIMs and a total traffic value transmitted by the MVNO. The operation of obtaining the plurality of SoftSIMs and the total traffic value transmitted by the MVNO may further include (1) evaluating a number of SoftSIM based on the number of plurality of testing terminals and a historical number of testing terminals, (2) evaluating the total traffic value based on the number of plurality of testing terminals, the historical number of testing terminals and a maximum testing traffic value testing terminals, and (3) obtaining from the virtual network operator MVNO the plurality of SoftSIMs for the number of SoftSIM evaluated and the total traffic value.

In this example embodiment, the SoftSIM cloud server 200 may establish a connection with the MVNO/MVNE network & the server 300 through the SoftSIM resource and traffic management module 203, and may further use the SoftSIM resource and traffic management module 203 to perform the expected assessment of the number of SoftSIM and the total traffic, and periodically obtain the number of SoftSIM and total traffic from MVNO/MVNE network & server 300 at a desired (or alternatively, predetermined) interval. For example, the SoftSIM resource pool 201 may be informed of the historical number of testing terminals (the SoftSIM requirements) and the SoftSIM traffic dynamic allocation module 202 may be informed of the maximum testing traffic value of testing terminals. For example, the maximum testing traffic value of testing terminals may be the largest one of the maximum testing traffic values of all testing terminals in the previous testing. Then, the SoftSIM resource and traffic management module 203 may evaluate the number of SoftSIM as the greater one of the number of a plurality of testing terminals and the historical number of testing terminals, and also evaluate the total traffic value as the product of the greater one of the number of the plurality of testing terminals and the historical number of testing terminals and the maximum testing traffic value of testing terminals, based on the results obtained from the SoftSIM resource pool 201 and the SoftSIM traffic dynamic allocation module 202.

Next, in operation S420, a SoftSIM resource pool for placing the plurality of SoftSIMs may be formed, wherein the SoftSIM resource pool is used to allocate SoftSIMs to a plurality of testing terminals, respectively, and recycle SoftSIMs from the plurality of testing terminals. In this example embodiment, the SoftSIM resource pool (e.g., the SoftSIM resource pool 201) can be shared by a plurality of testing terminals, and the SoftSIMs are distributed to the testing terminals when testing is needed and recycled from the testing terminals when testing is completed. The recycled SoftSIMs can be continually distributed to the testing terminals with testing requirement, thus realizing efficient utilization of resources, avoiding frequent insertion of physical SIMs on the production line and saving cost of a large number of physical SIM cards by using flexible SoftSIM configurations. Here, the total number of testing terminals used in the testing procedure (the SoftSIM requirement) can be stored on the SoftSIM cloud server side as the historical number of testing terminals, which can be used to evaluate the number of SoftSIM.

Then, in operation S430, a testing traffic value allocated to a corresponding one of the testing terminals from the total traffic value and a SoftSIM allocated to a corresponding one of the testing terminals by the SoftSIM resource pool may be distributed to the plurality of testing terminals. The operation of distributing may include (1) connecting to the plurality of testing terminals, receiving SoftSIM requests transmitted by the plurality of testing terminals, and (2) distributing a testing traffic value and a SoftSIM allocated to a corresponding one of the testing terminals to the plurality of testing terminals based on the SoftSIM requests, wherein the testing traffic value is a default traffic value. In this example embodiment, the plurality of testing terminals 100 may establish connection with the SoftSIM cloud server 200. For example, the SoftSIM connection APP 104 module of the plurality of test terminals 100 may complete the connection with the SoftSIM pushing/recycling 204 module of the SoftSIM cloud server 200 through a USB cable or a Wi-Fi connection. The plurality of test terminals 100 may transmit SoftSIM requests to the SoftSIM cloud server 200, and the SoftSIM cloud server 200 distributes the testing traffic value and SoftSIM assigned to a corresponding one of the testing terminals to the plurality of testing terminals based on the SoftSIM requests. Here, the testing traffic value may be the default traffic value (e.g., 1 GB) or the maximum testing traffic value of the testing terminal (for the last time).

According to an example embodiment of the disclosure, the SoftSIM cloud server may obtain the first traffic predicted value of the testing terminal, wherein the first traffic predicted value is the traffic value predicted by the testing terminal to be desired for the testing task. If the first traffic predicted value is greater than the testing traffic value of the testing terminal, the first traffic indication value is transmitted to the testing terminal, and the testing traffic value of the testing terminal is updated with the first traffic indication value, wherein the first traffic indication value is equal to the first traffic predicted value. The SoftSIM cloud server 200 may set the maximum testing traffic value equal to the updated testing traffic value. The maximum testing traffic value may be stored on the side of the SoftSIM cloud server as the historical data of the testing and may be used to calculate the maximum testing traffic value of testing terminals.

In this example embodiment, after completing registration in a network, the testing terminal 100 can be aware of the actual traffic value desired for the testing task (the first traffic predicted value), and at this time, the assigned testing traffic value (e.g., the default testing traffic value) may be smaller than the actual desired traffic value, making it difficult to support the real-network testing. Thus, the SoftSIM cloud server 200 (e.g., using the SoftSIM traffic dynamic allocation module 202) may adjust the traffic value of the testing terminal 100 once before starting the real-network testing. The maximum testing traffic value here is the actual test traffic value used by the testing terminal during the testing, which is set to be equal to the updated testing traffic value at this time.

According to the example embodiment of the disclosure, the SoftSIM cloud server can obtain a remaining traffic value of the testing terminal in real time, instruct the testing terminal to transmit a second traffic predicted value additionally desired for the testing task when the remaining traffic value is less than or equal to the desired (or alternatively, predetermined or reference) traffic value or is zero. After obtaining the second traffic predicted value transmitted by the testing terminal, if the second traffic predicted value is greater than the remaining traffic value, the SoftSIM cloud server may transmit the second traffic indication value to the testing terminal, update the remaining traffic value of the testing terminal with the second traffic indication value, and update the maximum testing traffic value to be equal to the second traffic indication value plus the difference between the testing traffic value and the remaining traffic value, wherein the second traffic indication value is equal to the second traffic predicted value. In this example embodiment, in the procedure of real-network testing, the testing traffic desired by the testing terminal 100 may change due to the change of the testing task, and the assigned testing traffic value may be smaller than the actual desired traffic value, making it difficult to support the real-network testing. Therefore, in the procedure of the real-network testing, the SoftSIM cloud server 200 (e.g., using the SoftSIM traffic dynamic allocation module 202) can dynamically adjust the traffic value of the terminal. The maximum testing traffic value here is the actual test traffic value used by the testing terminal during the testing, which is then updated to be equal to the second traffic indication value plus the difference between the testing traffic value and the remaining traffic value.

As another example, the SoftSIM cloud server 200 may obtain a remaining traffic value of the testing terminal in real time from the MVNO/MVNE network & server 300.

Further, the SoftSIM cloud server 200 may receive and recycle the SoftSIMs and remaining traffic values returned by the plurality of testing terminals and put the recycled SoftSIMs back into the SoftSIM resource pool 201. In this example embodiment, the SoftSIM cloud server 200 may use the SoftSIM pushing/recycling module 204 to receive and recycle SoftSIMs and put them into its own SoftSIM resource pool 201 for other testing terminals or for the next testing, and the SoftSIM cloud server 200 may also record the remaining traffic values for other testing terminals or for the next testing.

As described above, a testing method based on SoftSIM on the SoftSIM cloud server side according to the example embodiment can realize automatic real-network testing of the production line by using limited SoftSIM resources and traffic, avoid frequent insertion of physical SIM cards on the production line, and save the cost of a large number of physical SIM cards by using flexible SoftSIM configurations, providing convenience for testing. Further, the use of dynamically configurable SoftSIM communication avoids wasting the communication cost of individual physical SIM card.

The testing procedure based on the SoftSIM testing will be illustrated in detail with reference to FIG. 5 below.

Figure 5:
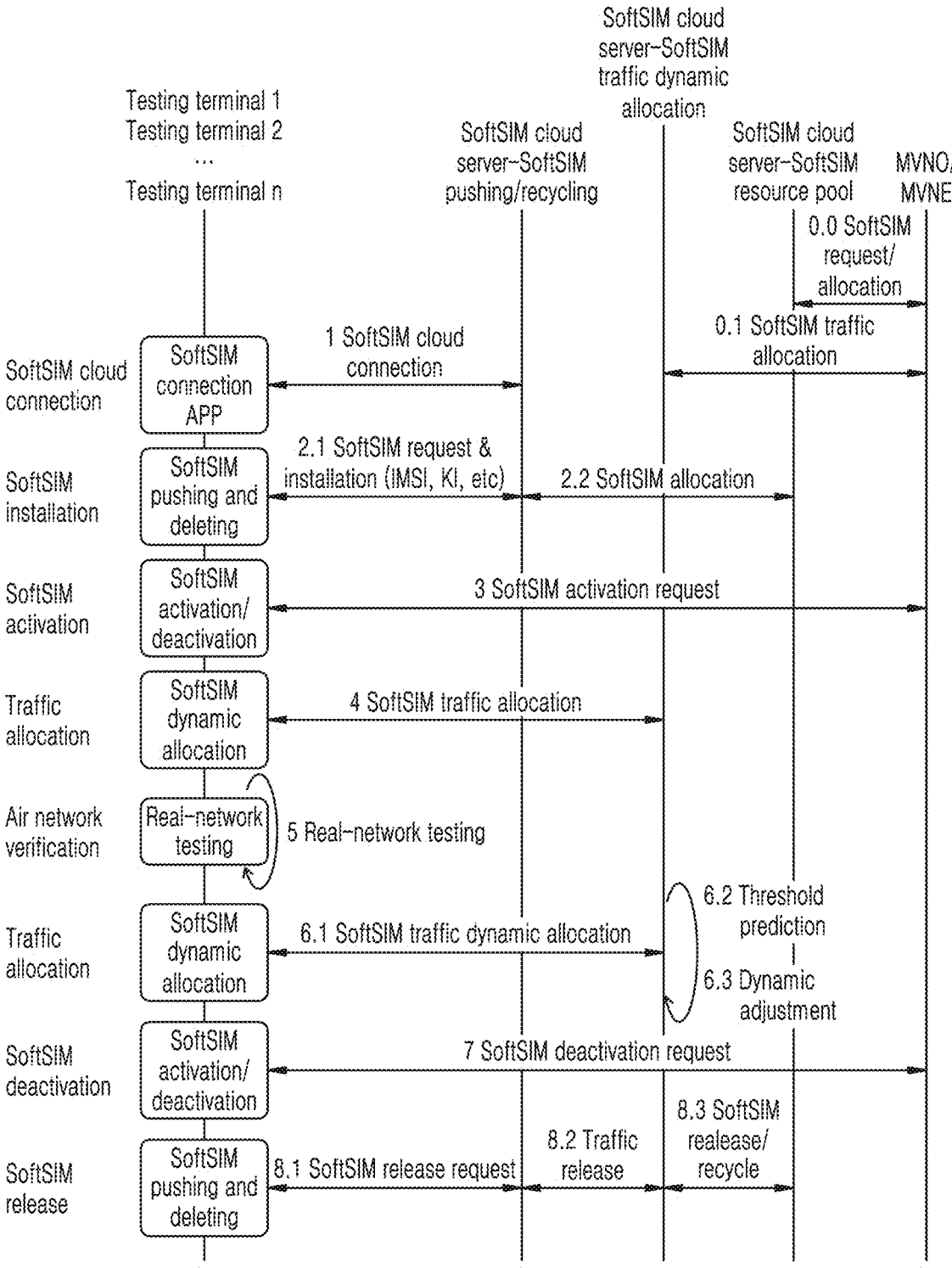
FIG. 5 illustrates a testing procedure based on SoftSIM testing according to an example embodiment.

As shown in FIG. 5, in operation 0 (including operations 0.0 and 0.1) of the SoftSIM cloud server construction, the SoftSIM cloud server 200 periodically obtains a number of SoftSIM and a total traffic from the MVNO/MVNE network & servers based on expected evaluation of the number of SoftSIM and the total traffic, which includes the SoftSIM request/allocation between the SoftSIM cloud server (e.g., the SoftSIM resource pool 201) and the MVNO/MVNE network & servers and SoftSIM traffic allocation between the SoftSIM cloud server (e.g., the SoftSIM traffic dynamic allocation module 202) and the MVNO/MVNE network & servers.

In operation 1 of the SoftSIM cloud connection, a plurality of testing terminals (the SoftSIM connected APP) and the SoftSIM cloud server (e.g., the SoftSIM pushing/recycling module 204) establish the SoftSIM cloud connection through USB cable or Wi-Fi connection.

In operation 2 (including operations 2.1 and 2.2) of the SoftSIM installation, the plurality of testing terminals (e.g., the SoftSIM pushing and deleting module 101) transmit SoftSIM requests, and the SoftSIM cloud server (e.g., the SoftSIM pushing/recycling module 204) transmits SoftSIMs and default traffic values to the plurality of testing terminals based on the SoftSIM requests, then the plurality of testing terminals complete the import and installation of SoftSIMs. Here, the SoftSIM cloud server (e.g., the SoftSIM resource pool 201) allocates SoftSIMs to the plurality of testing terminals, wherein SoftSIM includes card information such as IMSI and KI.

In operation 3 of the SoftSIM activation, the plurality of testing terminals (the SoftSIM activation/deactivation) transmit activation requests to the MVNO/MVNE network & server to activate SoftSIMs and complete the network registration.

In operation 4 of traffic allocation, the SoftSIM cloud server (e.g., the SoftSIM traffic dynamic allocation module 202) allocates traffic values to the plurality of testing terminals. In other words, the SoftSIM traffic dynamic allocation module 202 performs the SoftSIM traffic dynamic allocation (e.g., a traffic value adjustment before the start of real-network testing).

In operation 5 of the air network verification, the plurality of testing terminals (real-network testing) start real-network testing.

In operation 6 (including operations 6.1, 6.2, and 6.3) of the traffic allocation, the SoftSIM cloud server (e.g., the SoftSIM traffic dynamic allocation module 202) dynamically allocates traffic values to the plurality of testing terminals (e.g., performs the SoftSIM traffic dynamic allocation), including a comparison judgment (threshold prediction) between a remaining traffic value and a desired (or alternatively, predetermined or reference) traffic value performed by the SoftSIM cloud server (e.g., the SoftSIM traffic dynamic allocation module 202), and an operation of dynamically adjusting the traffic value when the remaining traffic value is less than the traffic value desired for an actual testing task (dynamic adjustment).

In operation 7 of the SoftSIM deactivation, the plurality of testing terminals (e.g., the SoftSIM activation/deactivation module 102) transmit SoftSIM deactivation requests to the MVNO/MVNE network & server, thereby deactivating the SoftSIMs.

In operation 8 (including operations 8.1, 8.2, and 8.3) of the SoftSIM release, the plurality of testing terminals (e.g., the SoftSIM pushing and deleting module 101) release and delete SoftSIMs and transmit SoftSIMs release requests to the SoftSIM cloud server (e.g., the SoftSIM pushing/recycling module 204). The SoftSIM cloud server (e.g., the SoftSIM traffic dynamic allocation module 202) recycles the released remaining traffic, and the SoftSIM cloud server (e.g., the SoftSIM resource pool 201) recycles SoftSIMs for the next batch of testing terminals.

The procedure of dynamic allocation of traffic values based on SoftSIM testing is explained in detail in FIG. 6 below.

Figure 6:
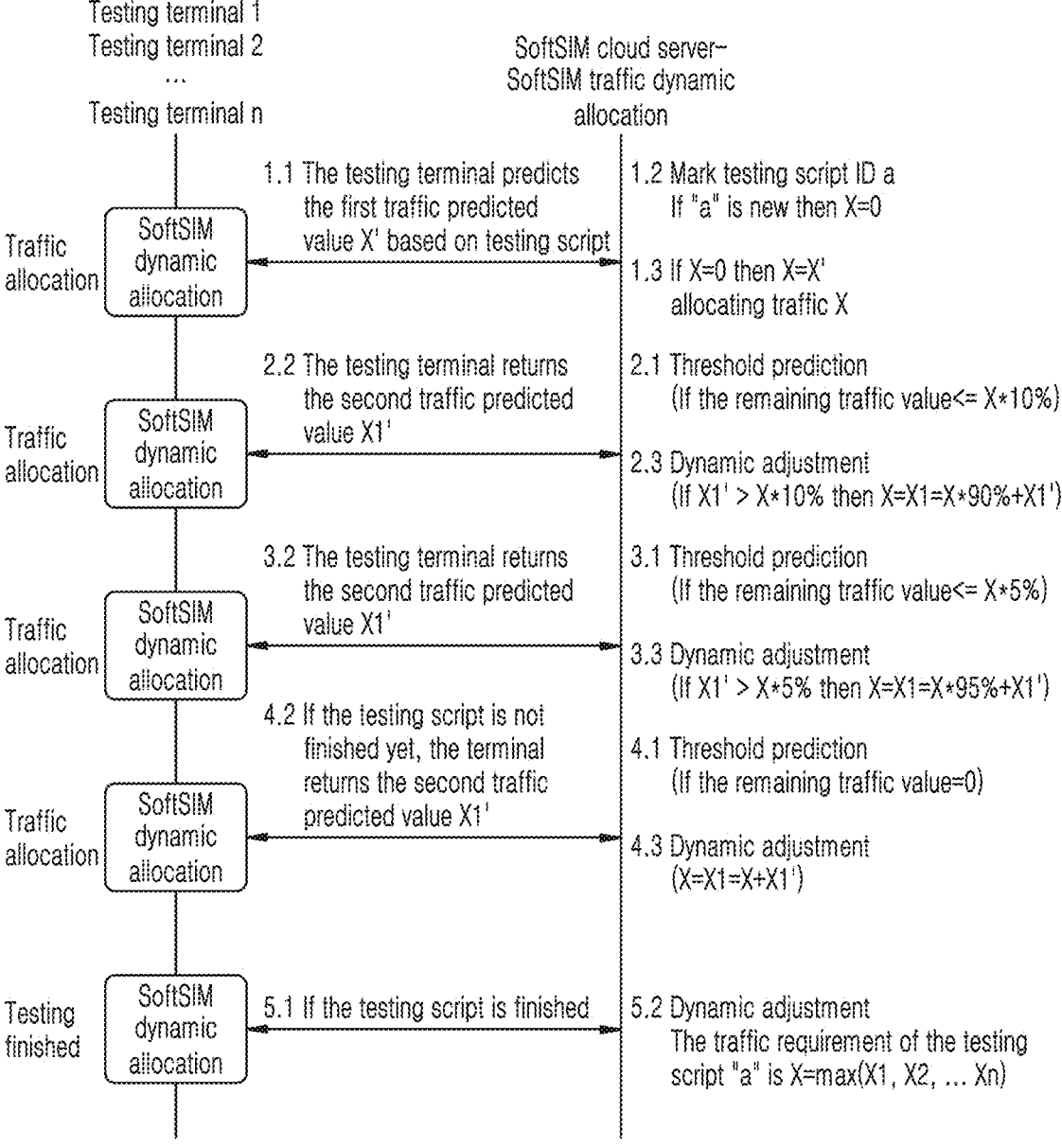
FIG. 6 illustrates the procedure of dynamic allocation of traffic values based on SoftSIM testing according to an example embodiment.

As shown in FIG. 6, the procedure of dynamic allocation of traffic values based on SoftSIM testing is performed based on the interaction between the plurality of testing terminals (e.g., the SoftSIM dynamic allocation module 103) and the SoftSIM cloud server (e.g., the SoftSIM traffic dynamic allocation module 202). Here, the operation 1 can correspond to the operation 4 of traffic allocation in FIG. 5, and operations 2-5 can correspond to the operation 6 of the traffic allocation in FIG. 5.

Taking the testing terminal 100-1 as an example, in operation 1 (including operations 1.1, 1.2, and 1.3), testing terminal 100-1 imports a testing script that predicts the first traffic predicted value X' desired for the testing task. If the SoftSIM cloud server detects that the script ID "a" of testing terminal 100-1 is new, the testing traffic value for the testing terminal 100-1 is X=0 (the default traffic value is 0). If test terminal 100-1 is allocated the test traffic value X=0, the test traffic value is assigned to the terminal as the first traffic indication value (X=X' and the first traffic indication value is equal to the first traffic predicted value X'). Operation 1 may be a traffic value adjustment before the testing terminal 100-1 starting the real-network testing. Also, one or more testing terminals can import the testing script "a". For example, when testing terminals 100-1 and 100-2 import the testing script "a" for operation, the SoftSIM cloud server detects that testing terminal 100-2 uses testing script "a" again after testing terminal 100-1 using test script "a", and the SoftSIM cloud server does not consider the script ID "a" to be new. The testing traffic value X assigned to the terminal at this time may not be 0 (the default traffic value is not 0).

If the first traffic predicted value X'>X is predicted to be desired for the testing task, the testing traffic value is assigned to the terminal as the first traffic indication value X' (X=X', the first traffic indication value is equal to the first traffic predicted value X').

Operations 2-4 are the dynamic adjustment procedure of the traffic of the testing terminal 100-1 during the real-network testing. In operation 2 (including operations 2.1, 2.2, and 2.3), the SoftSIM cloud server obtains a remaining traffic value of the testing terminal 100-1 in real time. If the remaining traffic value is less than or equal to 10% of the testing traffic value (X*10%), the second traffic predicted value X1' that is additionally desired for the testing task transmitted by the testing terminal 100-1 is obtained. If the second traffic predicted value is greater than 10% of the testing traffic value (X1'>X*10%), the second traffic indication value (equal to the second traffic predicted value X1') is transmitted to the testing terminal 100-1, and the remaining traffic value of the testing terminal 100-1 is increased to X1'. At this time, the testing traffic value is increased to X=X1=X*90%+X1', wherein X1 is the maximum testing traffic value of testing terminal 100-1. Also, the second traffic predicted value can be compared directly with the remaining traffic value. If the second traffic predicted value is greater than the remaining traffic value, the second traffic indication value (equal to the second traffic predicted value X1') is transmitted to the testing terminal 100-1, and the remaining traffic value of the testing terminal 100-1 is increased to X1'. At this time, the testing traffic value is increased to X=X1=the testing traffic value–the remaining traffic value+X'.

In operation 3 (including operations 3.1, 3.2, and 3.3), the SoftSIM cloud server obtains the remaining traffic value of the testing terminal 100-1 in real time. If the remaining traffic value is less than or equal to 5% of the testing traffic value (X*5%), the second traffic predicted value X1' that is additionally desired for the testing task transmitted by the testing terminal 100-1 is obtained. If the second traffic predicted value is greater than 5% of the testing traffic value (X1'>X*5%), the second traffic indication value (equal to the second traffic predicted value X1') is transmitted to the testing terminal 100-1 to increase the remaining traffic value of the testing terminal 100-1 to X1'. At this time, the testing traffic value is increased to X=X1=X*95%+X1', wherein X1 is the maximum testing traffic value of testing terminal 100-1. Further, the second traffic predicted value can be compared directly with the remaining traffic value. If the second traffic predicted value is greater than the remaining traffic value, the second traffic indication value (equal to the second traffic predicted value X1') is transmitted to the testing terminal 100-1, and the remaining traffic value of the testing terminal 100-1 is increased to X1'. At this time, the testing traffic value is increased to X=X1=the testing traffic value–the remaining traffic value+X'.

In operation 4 (including operations 4.1, 4.2, and 4.3), the SoftSIM cloud server obtains the remaining traffic value of the test terminal 100-1 in real time. If the remaining traffic value is equal to zero, the second traffic predicted value X1' that is additionally desired for the testing task transmitted by the testing terminal 100-1 is obtained (if the testing script is not finished yet, the terminal returns the second traffic predicted value X1'), and the second traffic indication value (equal to the second traffic predicted value X1') is transmitted to the testing terminal 100-1 to increase the remaining traffic value of the testing terminal 100-1 to X1'. At this time, the testing traffic value is increased to X=X1=X+X1', wherein X1 is the maximum testing traffic value of the testing terminal 100-1.

In operation 5 (including operations 5.1 and 5.2), when the testing of the testing terminal 100-1 is completed (end of the testing script), the traffic requirement of the test script "a" is set to X=max(X1, X2, . . . , Xn), wherein X1, X2, . . . , Xn indicate the maximum traffic values of the testing terminals 100-1, 100-2 . . . 100-n. That is, the test script "a" can be executed on one or more testing terminals, and when executed on the plurality testing terminals 100-1, 100-2 . . . 100-n, the traffic requirement of test script "a" in operation 5 is the largest one of the maximum traffic values of all test terminals 100-1, 100-2 . . . 100-n that use test script "a". Here, the traffic requirement of the test script "a" can be used as the maximum testing traffic value of testing terminals for evaluating the total traffic value.

Figure 7:
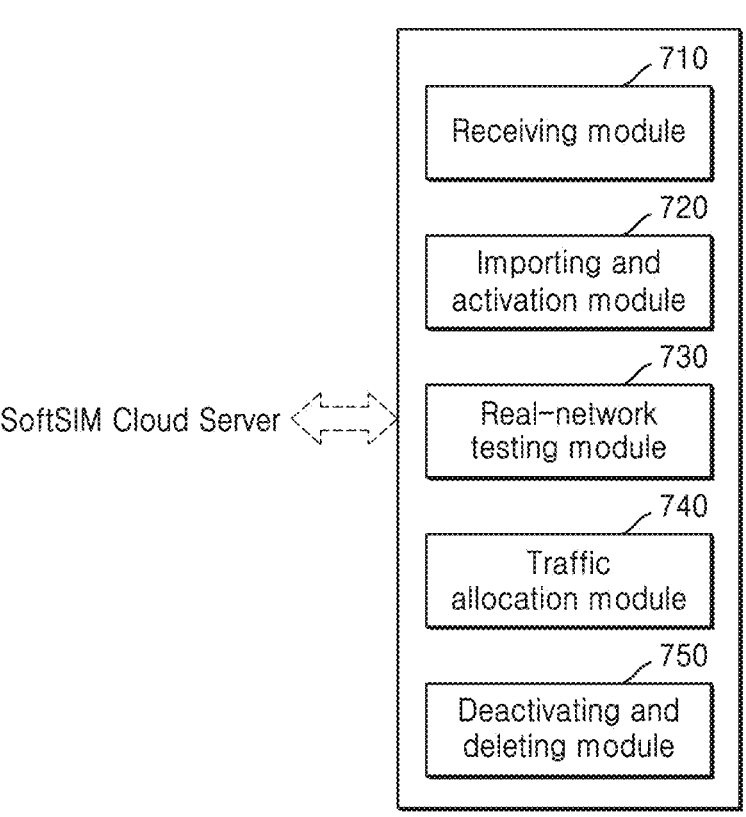
FIG. 7 illustrates a block diagram of a testing terminal according to an example embodiment.

FIG. 7 illustrates a block diagram of a testing terminal according to an example embodiment.

As shown in FIG. 7, the testing terminal 700 may include a receiving module 710, an importing and activation module 720, and a real-network testing module 730, wherein the receiving module 710 receives a SoftSIM and a testing traffic value transmitted by a SoftSIM cloud server, the importing and activation module 720 imports and activates the received SoftSIM and completes registration in a network, and the real-network testing module 730 performs a real-network testing based on the SoftSIM and the received testing traffic value.

According to the example embodiment, the test terminal 700 further includes a traffic allocation module 740. The traffic allocation module 740 predicts a first traffic predicted value desired for the testing task, transmits the first traffic predicted value to the SoftSIM cloud server, receives a first traffic indication value assigned by the SoftSIM cloud server as the testing traffic value. If the first traffic predicted value is greater than the testing traffic value, the first traffic indication value is determined to be equal to the first traffic predicted value by the SoftSIM cloud server.

According to the example embodiment, the real-network testing module 730 may transmit a remaining traffic value to the SoftSIM cloud server, transmit a second traffic predicted value additionally desired for the testing task to the SoftSIM cloud server based on the indication from the SoftSIM cloud server, receive a second traffic indication value assigned by the SoftSIM cloud server as the available remaining traffic value for the real-network testing. The second traffic indication value is determined to be equal to the second traffic predicted value by the SoftSIM cloud server when the second traffic predicted value is greater than the remaining traffic value.

According to the example embodiment, the testing terminal 700 further includes a deactivating and deleting module 750, which may deactivate and delete the SoftSIM after completion of the real-network testing, return the deleted SoftSIM and the remaining traffic value to the SoftSIM cloud server.

Figure 8:
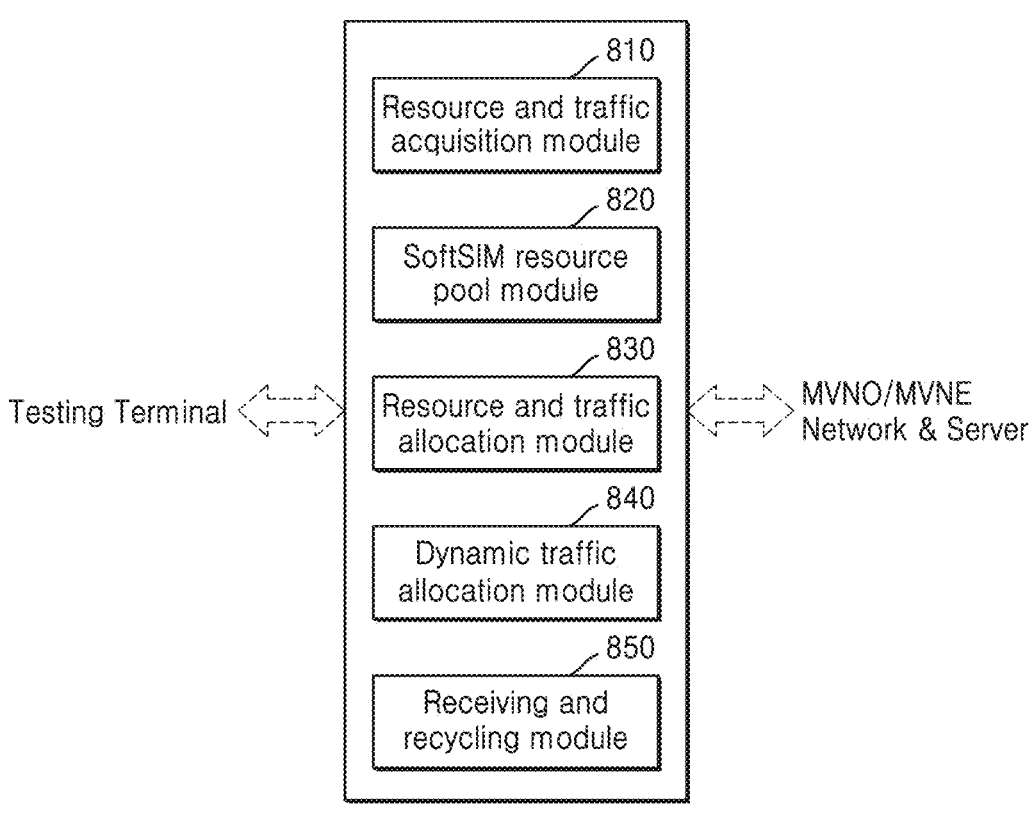
FIG. 8 illustrates a block diagram of a SoftSIM cloud server according to an example embodiment.

FIG. 8 illustrates a block diagram of a SoftSIM cloud server according to the example embodiment.

As shown in FIG. 8, the SoftSIM cloud server 800 may include a resource and traffic acquisition module 810, a SoftSIM resource pool module 820, and a resource and traffic allocation module 830. The resource and traffic acquisition module 810 may obtain a plurality of SoftSIMs and a total traffic value. The SoftSIM resource pool module 820 may form a SoftSIM resource pool for placing the plurality of SoftSIMs. The SoftSIM resource pool is used to allocate SoftSIMs to the plurality of testing terminals, respectively, and recycle SoftSIMs from the plurality of testing terminals. The resource and traffic allocation module 830 may distribute to the plurality of testing terminals a testing traffic value allocated to a corresponding one of the testing terminals from the total traffic value and a SoftSIM allocated to a corresponding one of the testing terminals by the SoftSIM resource pool.

According to the example embodiment, the resource and traffic acquisition module 810 may also connect to a mobile virtual network operator (MVNO), and obtain the plurality of SoftSIMs and the total traffic value transmitted by the MVNO.

According to the example embodiment, the resource and traffic acquisition module 810 may further evaluate the number of SoftSIM based on a number of plurality of testing terminals and a historical number of testing terminals, evaluate the total traffic value based on the number of plurality of testing terminals, the historical number of testing terminals and the maximum testing traffic value of testing terminals, obtain from the virtual network operator MVNO the plurality of SoftSIMs for the number of SoftSIM evaluated and the total traffic value.

According to the example embodiment, the resource and traffic allocation module 830 may further connect to the plurality of testing terminals, receive SoftSIM requests transmitted by the plurality of testing terminals, distribute a testing traffic value and a SoftSIM allocated to a corresponding one of the testing terminals to the plurality of testing terminals based on the SoftSIM requests, wherein the testing traffic value is a default traffic value.

According to the example embodiment, the SoftSIM cloud server 800 may further include a dynamic traffic allocation module 840, and the dynamic traffic allocation module 840 may obtain a first traffic predicted value of the testing terminal, wherein the first traffic predicted value is the traffic value predicted by the testing terminal to be desired for the testing task. The dynamic traffic allocation module 840 transmits a first traffic indication value to the testing terminal if the first traffic predicted value is greater than the testing traffic value of the testing terminal, and updates the testing traffic value of the testing terminal with the first traffic indication value, wherein the first traffic indication value is equal to the first traffic predicted value. The dynamic traffic allocation module 840 sets the maximum testing traffic value equal to the updated testing traffic value.

According to the example embodiment, the dynamic traffic allocation module 840 may also obtain the remaining traffic value of the testing terminal in real time, instruct the testing terminal to transmit a second traffic predicted value additionally desired for the testing task when the remaining traffic value is less than or equal to the desired (or alternatively, predetermined or reference) traffic value or is zero. After obtaining the second traffic predicted value transmitted by the testing terminal, if the second traffic predicted value is greater than the remaining traffic value, the dynamic traffic allocation module 840 transmits the second traffic indication value to the testing terminal and update the remaining traffic value of the testing terminal with the second traffic indication value, and updates the maximum testing traffic value to be equal to the second traffic indication value plus the difference between the testing traffic value and the remaining traffic value, wherein the second traffic indication value is equal to the second traffic predicted value.

According to the example embodiment, the SoftSIM cloud server 800 may further include a receiving and recycling module 850, and the receiving and recycling module 850 may receive and recycle the SoftSIMs and the remaining traffic values returned by the plurality of testing terminals, and put the recycling SoftSIMs back into the SoftSIM resource pool.

FIG. 9 illustrates a flowchart of a testing method based on SoftSIM in which a testing terminal and a SoftSIM cloud server participate together according to the example embodiment.

First, in operation S910, the SoftSIM cloud server obtains a plurality of SoftSIMs and a total traffic value. According to an example embodiment of the disclosure, the operation of obtaining the plurality of SoftSIMs and the total traffic value may include (1) connecting to a mobile virtual network operator MVNO and (2) obtaining the plurality of SoftSIMs and the total traffic value transmitted by the MVNO. The operation of obtaining the plurality of SoftSIMs and the total traffic value transmitted by the MVNO may further include (1) evaluating a number of SoftSIMs based on a number of plurality of testing terminals and a historical number of testing terminals, (2) evaluating the total traffic value based on the number of plurality of testing terminals, the historical number of testing terminals, and the maximum testing traffic value of testing terminals, and (3) obtaining from the virtual network operator MVNO the plurality of SoftSIMs for the number of SoftSIM evaluated and the total traffic value.

Next, in operation S920, the SoftSIM cloud server forms a SoftSIM resource pool for placing the plurality of SoftSIMs, wherein the SoftSIM resource pool is used to allocate SoftSIMs to a plurality of testing terminals, respectively, and recycle SoftSIMs from the plurality of testing terminals.

Next, in operation S930, the SoftSIM cloud server distributes to the plurality of testing terminals a testing traffic value allocated to a corresponding one of the testing terminals from the total traffic value and a SoftSIM allocated to a corresponding one of the testing terminals by the SoftSIM resource pool. The operation of distributing to the plurality of testing terminals may include connecting to the plurality of testing terminals, receiving SoftSIM requests transmitted by the plurality of testing terminals, and distributing a testing traffic value and a SoftSIM allocated to a corresponding one of the testing terminals to the plurality of test terminals based on the SoftSIM requests, wherein the testing traffic value is a default traffic value.

According to an example embodiment of the disclosure, the SoftSIM cloud server obtains a first traffic predicted value of the testing terminal, wherein the first traffic predicted value is the traffic value predicted by the testing terminal to be desired for the testing task, transmits a first traffic indication value to the testing terminal if the first traffic predicted value is greater than the testing traffic value of the testing terminal, and updates the testing traffic value of the testing terminal with the first traffic indication value, wherein the first traffic indication value is equal to the first traffic predicted value and the maximum testing traffic value is set to be equal to the updated testing traffic value.

According to an example embodiment of the disclosure, the SoftSIM cloud server obtains the remaining traffic value of the testing terminal in real time, instructs the testing terminal to transmit a second traffic predicted value additionally desired for the testing task when the remaining traffic value is less than or equal to the desired (or alternatively, predetermined or reference) traffic value or is zero, obtains the second traffic predicted value transmitted by the testing terminal, and if the second traffic predicted value is greater than the remaining traffic value, transmits the second traffic indication value to the testing terminal and updates the remaining traffic value of the testing terminal with the second traffic indication value, and updates the maximum testing traffic value equal to be the second traffic indication value plus the difference between the testing traffic value and the remaining traffic value, wherein the second traffic indication value is equal to the second traffic predicted value.

Further, the SoftSIM cloud server receives and recycles the SoftSIMs and the remaining traffic values returned by the plurality of testing terminals, and puts the recycling SoftSIMs back into the SoftSIM resource pool.

Next, in operation S940, the plurality of testing terminals receive a SoftSIM and a testing traffic value transmitted by a SoftSIM cloud server.

Next, in operation S950, the plurality of test terminals import and activate the received SoftSIM and complete registration in a network. After completing registration in the network, the testing terminal 100 also predicts a first traffic predicted value desired for the testing task, transmits the first traffic predicted value to the SoftSIM cloud server 200, receives a first traffic indication value assigned by the SoftSIM cloud server 200 as the testing traffic value, wherein if the first traffic predicted value is greater than the testing traffic value, the first traffic indication value is determined to be equal to the first traffic predicted value by the SoftSIM cloud server.

Then, in operation S960, the plurality of testing terminals perform a real-network testing based on the SoftSIM and the received testing traffic value. Further, the testing terminals transmit a remaining traffic value to the SoftSIM cloud server, transmit a second traffic predicted value additionally desired for the testing task to the SoftSIM cloud server based on the indication from the SoftSIM cloud server, and receive a second traffic indication value assigned by the SoftSIM cloud server as an available remaining traffic value for the real-network testing, wherein the second traffic indication value is determined to be equal to the second traffic predicted value by the SoftSIM cloud server when the second traffic predicted value is greater than the remaining traffic value.

After completion of the real-network testing, the testing terminal deactivates and deletes the SoftSIM, and returns the deleted SoftSIM and the remaining traffic value to the SoftSIM cloud server.

Further, some example embodiments of the present disclosure may provide a testing system based on SoftSIM including a plurality of testing terminals and a SoftSIM cloud server. In some example embodiments, the testing system may further include a mobile virtual network operator MVNO. Because a testing method based on SoftSIM described in FIG. 9 may be performed by a testing system based on SoftSIM including a plurality of testing terminals and a SoftSIM cloud server, and the SoftSIM cloud server may be configured to perform operations S910-S930 in FIG. 9, and the plurality of testing terminals may be configured to perform operations S940-S960 in FIG. 9. Therefore, any relevant details involved in the operations performed by the plurality of testing terminals and the SoftSIM cloud server in the testing system based on SoftSIM can refer to the description of FIG. 9 and are not repeated here.

Figure 10:
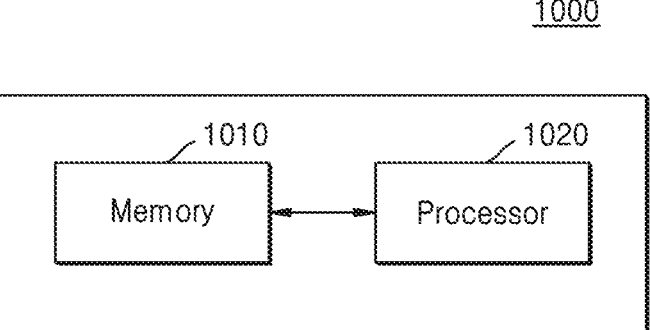
FIG. 10 illustrates a block diagram of an electronic device according to an example embodiment.

FIG. 10 illustrates a block diagram of an electronic device according to the example embodiment. The electronic device 1000 may be a testing terminals 100-1, 100-2, . . . , 100-n or a SoftSIM cloud server 200 of an example embodiment of the disclosure. Referring to FIG. 10, the electronic device 1000 may include at least one memory 1010 and at least one processor 1020. The at least one memory stores a set of computer executable instructions therein, and when a set of computer-executable instructions is executed by the at least one processor, a testing method based on SoftSIM according to an example embodiment of the present disclosure is executed.

Here, the electronic device does not have to be a single electronic device, but may also be any collection of devices or circuits capable of executing the instructions (or instruction set) individually or in combination. The electronic device may be part of an integrated control system or system manager, or may be configured to be an electronic device connecting local or remote (e.g., via wireless transmission) with an interface.

In an electronic device, the processor 1020 may include a central processing unit (CPU), a graphic processing unit (GPU), a programmable logic device, a dedicated processor system, a microcontroller, or a microprocessor. As an example and not a limitation, a processor may also include an analog processor, a digital processor, a microprocessor, a multicore processor, a processor array, a network processor, and the like.

The processor 1020 may run instructions or code stored in the memory 1010. The memory may also store data. The instructions and data may be sent and received over a network via a network interface device, wherein the network interface device may employ any known transmission protocol.

The memory 1010 may be integrated with the processor, for example, by arranging random access memory (RAM) or flash memory within an integrated circuit microprocessor. Further, the memory 1010 may include a separate device, such as an external disk drive, a storage array, or any other storage device that may be used by the database system. The memory 1010 and the processor 1020 may be operationally coupled or may communicate with each other, for example, via I/O ports, network connections, etc., so that the processor 1020 can read the files stored in the memory 1010.

Further, the electronic device may also include a video display (e.g., LCD) and a user interaction interface (such as keyboard, mouse, touch input device, etc.). All components of the electronic device may be connected to each other via a bus and/or network.

Any functional blocks or modules shown in the figures and described above may be implemented in processing circuitry such as hardware including logic circuits, a hardware/software combination such as a processor executing software, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

According to some example embodiments of the disclosure, a computer-readable storage medium, which is configured to store a computer program that, when executed by a processor, implements a testing method based on SoftSIM according to the present disclosure, may be provided. Examples of computer-readable storage media herein include read-only memory (ROM), random access programmable read-only memory (PROM), electrically erasable programmable read-only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD- RW, DVD+RW, DVD-RAM, BD-ROM, BD-R, BD-R LTH, BD-RE, Blu-ray or optical disk memory, hard disk drive (HDD), solid state drive (SSD), card-based memory (such as, multimedia cards, Secure Digital (SD) cards or Extreme Digital (XD) cards), magnetic tapes, floppy disks, magneto-optical data storage devices, optical data storage devices, hard disks, solid state disks, and any other device, the any other device being configured to store the computer programs and any associated data, data files, and data structures in a non-transitory manner and to provide the computer programs and any associated data, data files, and data structures to a processor or computer, so that the processor or computer can execute the computer program. The computer program in the computer readable storage medium may run in an environment deployed in a computer device such as a terminal, client, host, agent, server, etc., and furthermore, in one example, the computer program and any associated data, data files and data structures are distributed on a networked computer system such that the computer program and any associated data, data files and data structures are data structures are stored, accessed, and executed in a distributed manner by one or more processors or computers.

The testing methods, apparatuses, systems, and/or readable storage mediums based on SoftSIM according to some example embodiments of the disclosure facilitate testing for an automated real-network testing of a production line by using limited SoftSIM resources and traffic, avoid frequent insertion of physical SIM cards on the production line, and save the cost of a large number of physical SIM cards by using flexible SoftSIM configurations. Further, the use of dynamically configurable SoftSIM communication avoids wasting the communication cost of individual physical SIM cards.

Other example embodiments of the disclosure will readily come to the mind of those skilled in the art upon consideration of the specification and practice of the example embodiments disclosed herein. This application is intended to cover any variations, uses, or adaptations of the present disclosure that follow the general principles of the disclosure and include commonly known or customary technical means in the art that are not disclosed herein. The specification and the example embodiments are considered as examples only, and the real scope and spirit of the disclosure is indicated by the following claims.

It is to be understood that the disclosure is not limited to the precise structure already described above and illustrated in the accompanying drawings, and that various modifications and changes may be made without departing from its scope. The scope of the present disclosure is limited only by the appended claims.

What is claimed is:

1. A testing method based on a Soft Subscriber Identity Module (SoftSIM), comprising:
receiving a SoftSIM and a testing traffic value transmitted by a SoftSIM cloud server;
importing and activating the received SoftSIM and completing registration in a network; and
performing a real-network testing based on the SoftSIM and the received testing traffic value,
wherein the performing preceded by
predicting a first traffic predicted value desired for a testing task, transmitting the first traffic predicted value to the SoftSIM cloud server,
receiving a first traffic indication value assigned by the SoftSIM cloud server as the testing traffic value, and
the first traffic indication value is determined to be equal to the first traffic predicted value by the SoftSIM cloud server if the first traffic predicted value is greater than the testing traffic value.

2. The method of claim 1, wherein the performing comprising:
transmitting a remaining traffic value to the SoftSIM cloud server;
transmitting a second traffic predicted value additionally desired for the testing task to the SoftSIM cloud server based on an indication from the SoftSIM cloud server;
receiving a second traffic indication value assigned by the SoftSIM cloud server as an available remaining traffic value for the real-network testing; and
determining the second traffic indication value to be equal to the second traffic predicted value by the SoftSIM cloud server when the second traffic predicted value is greater than the remaining traffic value.

3. The method of claim 1, further comprising:
deactivating and deleting the SoftSIM after completion of the real-network testing; and
returning the deleted SoftSIM and a remaining traffic value to the SoftSIM cloud server.

4. A non-transitory computer-readable storage medium storing a computer program, which when executed by at least one processor, causes a computer system to implement the method of claim 1.

5. A testing method based on a Soft Subscriber Identity Module (SoftSIM), comprising:
obtaining a plurality of SoftSIMs and a total traffic value;
forming a SoftSIM resource pool configured to place the plurality of SoftSIMs thereon and configured to allocate SoftSIMs to a plurality of testing terminals, respectively, and recycle SoftSIMs from the plurality of testing terminals; and
distributing to the plurality of testing terminals a testing traffic value allocated to a corresponding one of the testing terminals from the total traffic value and a SoftSIM allocated to a corresponding one of the testing terminals by the SoftSIM resource pool.

6. The method of claim 5, wherein the obtaining comprising:
connecting to a mobile virtual network operator (MVNO), and
obtaining the plurality of SoftSIMs and the total traffic value transmitted by the MVNO.

7. The method of claim 6, wherein the obtaining comprising:
evaluating a number of SoftSIMs based on a number of the plurality of testing terminals and a historical number of testing terminals;
evaluating the total traffic value based on the number of the plurality of testing terminals, the historical number of testing terminals and a maximum testing traffic value of testing terminals; and
obtaining the plurality of SoftSIMs for the number of SoftSIMs evaluated and the total traffic value from the MVNO.

8. The method of claim 5, wherein the distributing comprising:
connecting to the plurality of testing terminals;
receiving SoftSIM requests transmitted by the plurality of testing terminals; and distributing a testing traffic value and a SoftSIM allocated to a corresponding one of the testing terminals to the plurality of test terminals based on the SoftSIM requests, wherein the testing traffic value is a default traffic value.

9. The method of claim 5, further comprising:

obtaining a first traffic predicted value of a testing terminal from among the testing terminals, the first traffic predicted value being a traffic value predicted by the testing terminal for a testing task;

transmitting a first traffic indication value to the testing terminal if the first traffic predicted value is greater than the testing traffic value of the testing terminal, and updating the testing traffic value of the testing terminal with the first traffic indication value, which is equal to the first traffic predicted value; and setting a maximum testing traffic value equal to the updated testing traffic value.

10. The method of claim 9, further comprising:

obtaining a remaining traffic value of the testing terminal in real time;

instructing the testing terminal to transmit a second traffic predicted value additionally desired for the testing task when the remaining traffic value is less than or equal to a reference traffic value or is zero;

obtaining the second traffic predicted value transmitted by the testing terminal; and if the second traffic predicted value is greater than the remaining traffic value, transmitting a second traffic indication value to the testing terminal and updating the remaining traffic value of the testing terminal with the second traffic indication value, and updating the maximum testing traffic value equal to the second traffic indication value plus a difference between the testing traffic value and the remaining traffic value, wherein the second traffic indication value is equal to the second traffic predicted value.

11. The method of claim 5, further comprising:

receiving and recycling a set of SoftSIMs and a set of remaining traffic values returned by the plurality of testing terminals; and putting the set of SoftSIMs back into the SoftSIM resource pool.

12. A testing terminal, comprising:

a memory configured to store computer-readable instructions; and one or more processors configured to connect to the memory and execute the computer-readable instructions such that the one or more processors are configured to cause the testing terminal to, receive a Soft Subscriber Identity Module (SoftSIM) and a testing traffic value transmitted by a SoftSIM cloud server, import and activate the received SoftSIM and complete registration in a network, and perform a real-network testing based on the SoftSIM and the received testing traffic value, wherein the one or more processors of the testing terminal further configured to cause the testing terminal to predict a first traffic predicted value desired for a testing task, transmit the first traffic predicted value to the SoftSIM cloud server, receive a first traffic indication value assigned by the SoftSIM cloud server as the testing traffic value, and the first traffic indication value is determined to be equal to the first traffic predicted value by the SoftSIM cloud server if the first traffic predicted value is greater than the testing traffic value.

13. The testing terminal of claim 12, the one or more processors of the testing terminal further configured to cause the testing terminal to, transmit a remaining traffic value to the SoftSIM cloud server;

transmit a second traffic predicted value additionally desired for the testing task to the SoftSIM cloud server based on an indication from the SoftSIM cloud server; and receive a second traffic indication value assigned by the SoftSIM cloud server as an available remaining traffic value for the real-network testing, wherein the testing terminal is configured to determine the second traffic indication value to be equal to the second traffic predicted value by the SoftSIM cloud server when the second traffic predicted value is greater than the remaining traffic value.

14. The testing terminal of claim 12, wherein the one or more processors of the testing terminal further configured to cause the testing terminal to, deactivate and delete the SoftSIM after completion of the real-network testing; and return the deleted SoftSIM and a remaining traffic value to the SoftSIM cloud server.

* * * * *